United States Patent [19]

Onodera

[11] Patent Number: 4,807,062
[45] Date of Patent: Feb. 21, 1989

[54] MULTIPLE FORCE RETRACT CIRCUIT FOR A MAGNETIC DISK DRIVE

[75] Inventor: Masako Onodera, Fussa, Japan

[73] Assignee: Kabushiki Kaisha Toshiba, Kawasaki, Japan

[21] Appl. No.: 913,396

[22] Filed: Sep. 30, 1986

[30] Foreign Application Priority Data

Sep. 30, 1985 [JP] Japan ................................ 60-216812

[51] Int. Cl.⁴ ........................... G11B 5/54; G05B 9/02
[52] U.S. Cl. ...................................... 360/75; 360/105; 318/563
[58] Field of Search ...................... 360/69, 75, 78, 102, 360/103, 105, 106, 108; 318/563, 565, 626, 672, 687, 696

[56] References Cited

U.S. PATENT DOCUMENTS

| | | | |
|---|---|---|---|
| 3,518,651 | 6/1970 | Keeney | 360/103 |
| 3,629,679 | 12/1971 | Halfhill | 318/563 |
| 4,139,874 | 2/1979 | Shiraishi | 360/75 |
| 4,237,501 | 12/1980 | Barmache et al. | 360/75 |
| 4,658,308 | 4/1987 | Sander, Jr. | 360/75 |
| 4,679,102 | 7/1987 | Wevers et al. | 360/105 |

Primary Examiner—Aristotelis M. Psitos
Assistant Examiner—David L. Robertson
Attorney, Agent, or Firm—Foley & Lardner, Schwartz, Jeffery, Schwaab, Mack, Blumenthal & Evans

[57] ABSTRACT

A magnetic disk drive in which a magnetic head contacts to a landing zone on a magnetic disk when the rotation of the magnetic disk is stopped. The magnetic disk drive is characterized by the provision of abnormality detection means for detecting that the drive is in abnormal condition, position detection means for detecting whether or not the magnetic head has moved to the landing zone or not, control means for outputting a first instruction signal when the abnormal condition is detected by the abnormality detection means and for outputting a second instruction signal when it is detected by the position detection means that the magnetic head has not yet moved to the landing zone, and drive means for driving the magnetic head by a first drive force when said first instruction signal is inputted and for driving the magnetic head by a second drive force greater than the first drive force when said second instruction signal is inputted, whereby the magnetic head is moved to the landing zone. Thus, even when the carriage is located at any position, or even when the magnetic disk drive is installed in any position, the optimum retraction is possible.

6 Claims, 3 Drawing Sheets

MULTIPLE FORCE RETRACT CIRCUIT FOR A MAGNETIC DISK DRIVE

BACKGROUND OF THE INVENTION

The present invention relates to a magnetic disk drive, and more particularly to a magnetic disk drive provided with a retract circuit.

Magnetic disk drives are provided with a magnetic disk and a magnetic head to effect read/write operations. In a normal operating condition, the magnetic disk rotates at a high speed and the magnetic head is floated slightly from the magnetic disk surface by air flow. This prevents that scratches occur on the recording surface of the magnetic disk to damage the data recorded thereon.

As stated above, since the magnetic disk has an arrangement such that the magnetic head is caused to be floated by air flow when the magnetic disk normally rotates at a high speed, there is no possibility that scratches occur on the data recording zone on the magnetic disc. However, when the rotation speed of the magnetic disk becomes slow due to the fact that an input power supply or the magnetic disk drive itself is in abnormal condition, or for other reasons, the magnetic head is not floated to become in contact with the data recording zone, giving rise to the possibility that scratches occur on the data recording zone. The magnetic head is in contact with a predetermined zone except for the data recording zone on the magnetic disk before the rotation of the magnetic disk is initiated, or when the magnetic disk is stopped. The predetermined zone is called an "landing zone".

In a typical magnetic disk drive, when the magnetic disk rotates at a high speed and the magnetic disk drive normally operates, the magnetic head is positioned above the data recording zone. In contrast, before the rotation of the magnetic disk is initiated, when the magnetic disk is stopped, and when the drive is in abnormal condition, the magnetic head is caused to be transferred to the landing zone except for the data recording zone on the magnetic disk. An electric circuit for transferring the magnetic head to the stop area in this manner is usually called a "retract circuit".

FIG. 3 is a block diagram illustrating an example of a retract circuit employed in the conventional magnetic disk drive. This retract circuit has an arrangement such that a voice coil 1a provided in a voice coil motor 1 for driving a carriage on which the magnetic head is mounted is switched to either a power supply 9 or a motor drive circuit 3 through contacts 2a and 2b provided in a relay 2 and is connected thereto.

The motor drive circuit 3 is connected to an analog switch 5 through a motor control circuit 4. This analog switch 5 responds to a retract signal 7 from a microcomputer 6 functioning as a control circuit for controlling the entirety of the retract circuit to deliver a constant current determined by a resistor 8 and a voltage V to the motor control circuit 4. In addition, for controlling the motor control circuit 4, a control signal is inputted from the microcomputer 6.

Before the circuit is powered, the contacts 2a of the relay 2 are closed in response to a motor off command of the motor signal. Simultaneously with the energization of the circuit, the relay 2 is switched so that the contacts 2b are closed. Thus, the retract circuit is placed in controllable state by the retract signal 7 from the microcomputer 6.

In such a condition, when the abnormality that the number of revolutions of the magnetic disc is decreased is detected by hardware or the magnetic disk drive is in abnormal state, e.g., a servo circuit for positioning a magnetic head is abnormal, the retract signal 7 is delivered from the microcomputer 6. Upon receiving this retract signal 7, the analog switch 5 delivers a constant current determined by the resistance value of the resistor 8 and the voltage V to the motor control circuit 4.

A force corresponding to the constant current thus delivered is transmitted to the voice coil motor 1 through the motor drive circuit 3 and the magnetic head is driven in the inner peripheral direction of the magnetic disk to move the magnetic head to the landing zone provided in advance.

In this instance, it is desirable that this drive force is always an optimum value. As apparent from FIG. 3, since the value of a current delivered to the motor control circuit 4 is determined by the resistance value of the single resistor 8, when the retract signal 7 is delivered, a certain constant current is delivered to the motor control circuit 4 in any case, so that the drive force is always maintained constant. Accordingly, it happens that this drive force is too weak or too strong dependent upon the magnetic head position or the direction in which the drive is installed.

FIG. 4 is a plan view illustrating the surface of the magnetic disk 10. The data recording zone 13 having data tracks for recording data is provided outside the landing zone 11. The innermost data track of the data recording zone 13 is called an "innermost cylinder 12" and the outermost data track of the data recording zone 13 is called an "outermost cylinder 14".

In such a magnetic disk drive, where a comparison between a force necessary for moving it from the innermost cylinder 12 to the landing zone 11 and a force necessary for moving it from the outermost cylinder 14 to the landing zone 11 is made, these forces are ordinarily different from each other.

However, when the conventional retract circuit is employed, the same drive force is always exerted on the magnetic head. For this reason, there is the possibility that if this drive force is too strong, the carriage forcibly collides with a stopper for stopping the magnetic head from moving it inside the landing zone 11 to damage the magnetic head, and if this drive force is too weak, the magnetic head cannot be reached to the landing zone 11.

FIGS. 5(A), 5(B) and 5(C) are perspective views illustrating examples of the installation of the magnetic disk drive 17. As seen from these figures, three different relative positional relationships between the magnetic disk 10 and the carriage 16 on which the magnetic head 15 is mounted are conceivable.

In the case where the magnetic disk 10 is installed in parallel with ground as shown in FIG. 5(A), even if the carriage 16 is always driven by a constant drive force, there is no problem. However, in the case where the magnetic disk 10 is installed perpendicular to ground as shown in FIG. 5(B) or FIG. 5(C), if the drive force of the carriage 16 is constant, there occurs a big problem. Namely, in the case shown in FIG. 5(B), unless the drive force applied to the magnetic head 15 by the retractor circuit is relatively large where the magnetic head 15 is above the outer peripheral portion of the magnetic disk 10, the magnetic head 15 cannot reach the landing zone 11. In contrast, in the case shown in FIG. 5(C), the magnetic head 15 will reach the landing zone 11 by a small drive force.

As stated above, when the magnetic head moves to the landing zone 11, there is not conducted a control such that a suitable retract current flows, resulting in incomplete retractive operation. This gives rise to a problem that the magnetic head stays on the recording surface. In such a case, there occurs a problem that the magnetic head damages the magnetic disk, with the result that data recorded on the magnetic disk is broken.

SUMMARY OF THE INVENTION

An object of the present invention is to provide a magnetic disk drive which allows the magnetic head to suitably and completely move to the landing zone in abnormal condition, thereby making it possible to protect the data from being broken.

The above-mentioned object is attained by a magnetic disk drive in which a magnetic head contacts a landing zone on a magnetic disk when the rotation of the magnetic disk is stopped, the magnetic disk drive being characterized by the provision of abnormality detection means for detecting that the drive is in abnormal condition, position detection circuit for detecting whether the magnetic head is located on the landing zone or not, control means for outputting a first instruction signal when abnormality is detected by the abnormality detection means and for outputting a second instruction signal when it is detected by the position detection circuit that the magnetic head has not yet moved to the landing zone, and drive means for driving the magnetic head by a first drive force when the first instruction signal is inputted and for driving the magnetic head by a second drive force when the second instruction signal is inputted, whereby the magnetic head is moved to the landing zone.

DETAILED DESCRIPTION OF THE INVENTION

Figure 1:
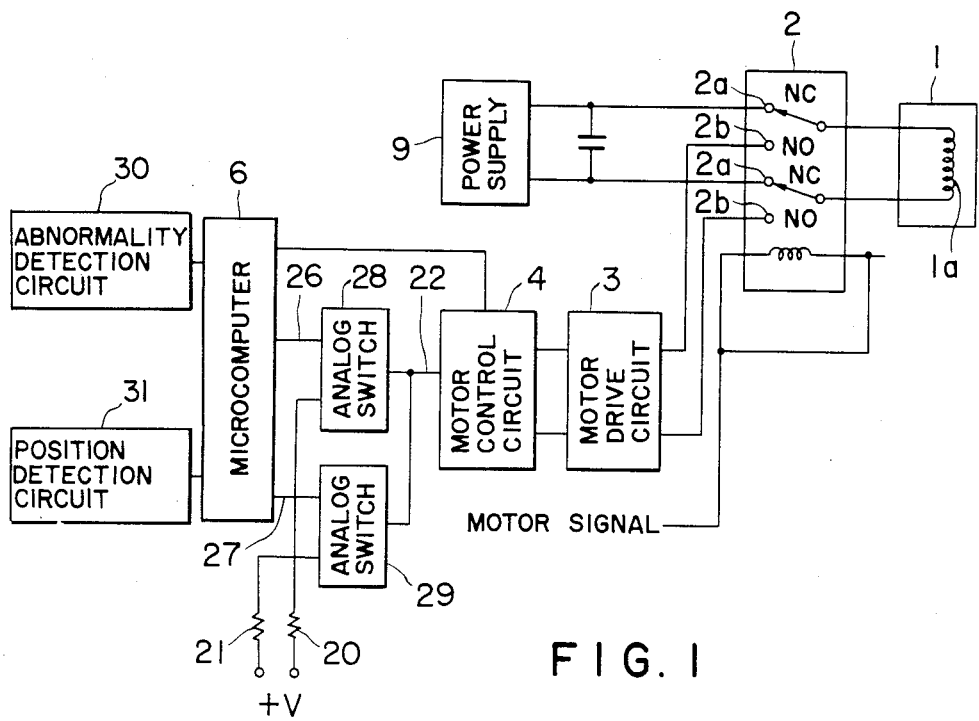
FIG. 1 is a block diagram illustrating a retract circuit used in a magnetic disk drive of an embodiment according to the present invention.
Figure 3:
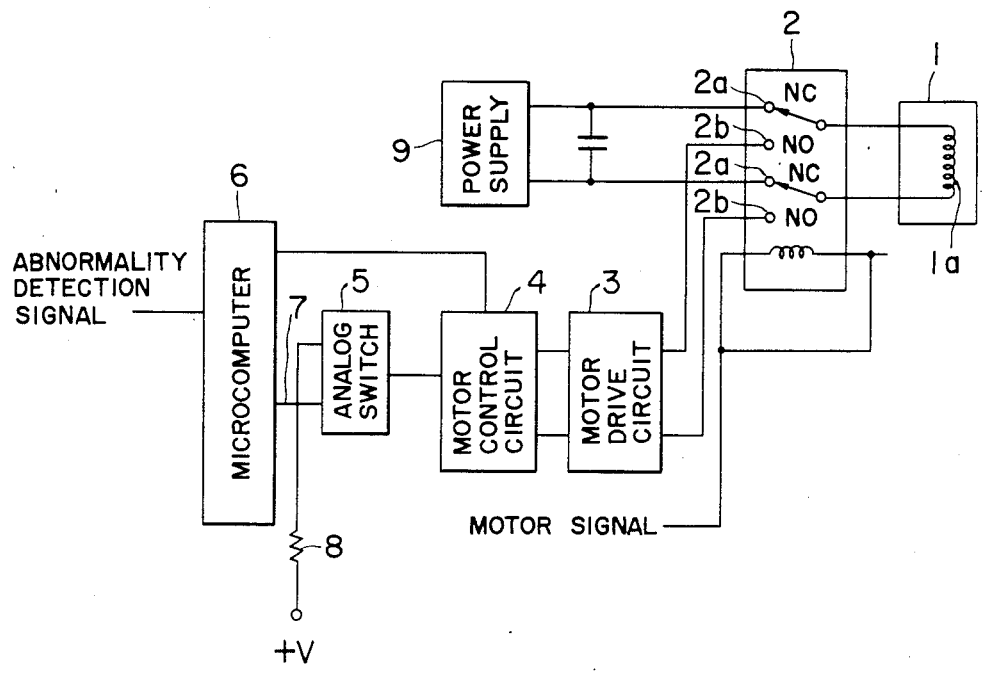
FIG. 3 is a block diagram illustrating a retract circuit used in a conventional magnetic disk drive.
Figure 4:
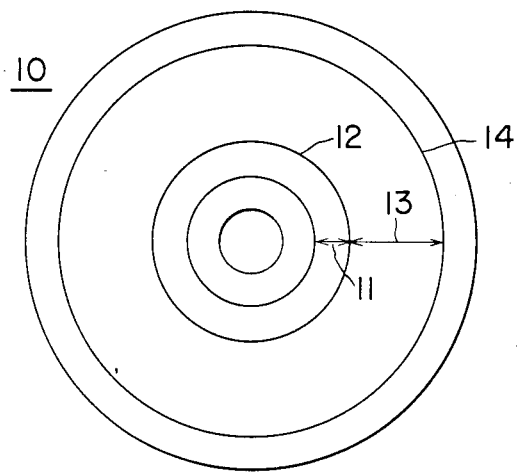
FIG. 4 is a plan view showing a magnetic disk used in the magnetic disk drive.
Figure 5:
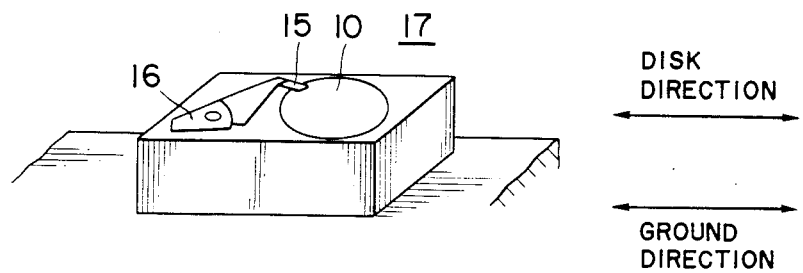
FIGS. 5(A), 5(B) and 5(C) are perspective views showing various installations of the magnetic disk drive.
Figure 5:
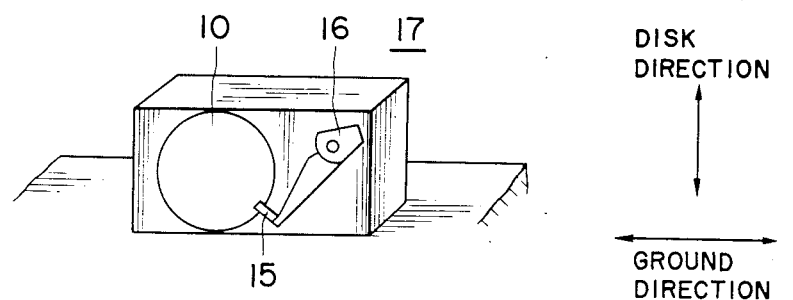
Figure 5:
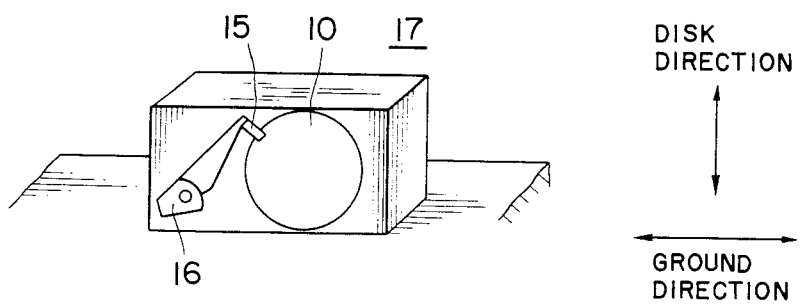

FIG. 1 is a block diagram showing a retract circuit employed in a magnetic disk drive according to the present invention, wherein the same components as those in FIG. 3 are denoted by the same reference numerals, respectively, and their explanation will be omitted. From the microcomputer 6 functioning as a control circuit of the entirety of the retract circuit, first and second retract signals 26 and 27 which will be described later are outputted and they are inputted to analog switches 28 and 29, respectively. To the analog switch 28, a predetermined current determined by the resistance value of a resistor 20 and a voltage V is delivered through the resistor 20. Likewise, to the analog switch 29, another predetermined current determined by the resistance value of a resistor 21 and the voltage V is delivered through the resistor 21. Outputs of the analog switches 28 and 29 are connected. Thus, the sum of predetermined currents flowing through the resistors 20 and 21 is delivered to a signal line 22.

This signal line 22 is connected to the input terminal of the motor control circuit 4 to which a control signal is inputted from the microcomputer 6. Settings of these resistors 20 and 21 are made as follows: First, the resistor 20 is set to a value at which a current value is produced which is capable of conducting a drive such that the magnetic head can be returned to the landing zone 11 in a condition where it does not collide with the stopper with rebound. In addition, the resistor 21 is set to a value at which the sum current output from the signal line 22 is produced which is capable of conducting a drive such that the magnetic head can be sufficiently returned to the landing zone even at the worst head position.

Figure 2:
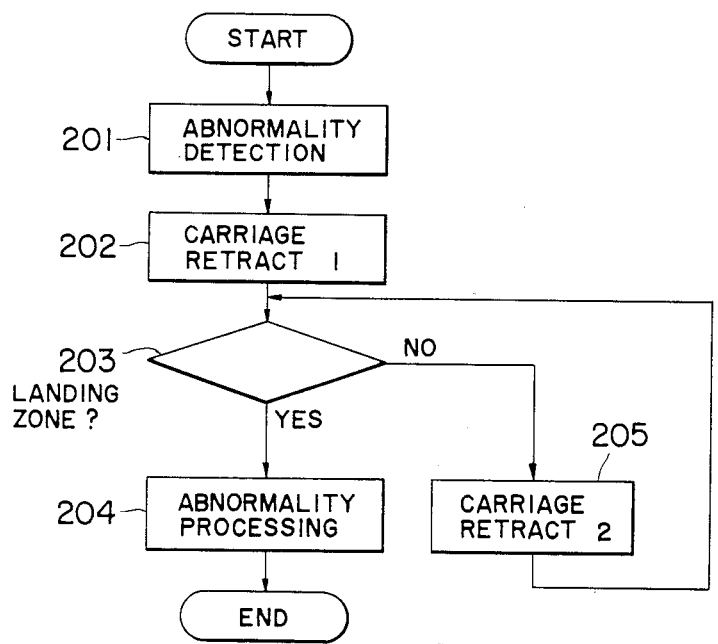
FIG. 2 is a flowchart for explaining the operation of the circuit shown in FIG. 1.

The operation of the retract circuit thus configured will now be described. FIG. 2 is a flowchart of the program for explaining the operation of the circuit shown in FIG. 1.

In the event that there occurs an abnormal condition necessary for stopping the magnetic disk drive, e.g., the decrease of the number of the revolutions of the magnetic disc, and the abnormality of a servo circuit for positioning a magnetic head, there is provided an abnormality detection circuit 30 for detecting this fact. When abnormality is detected by the abnormality detection circuit, the abnormality detection signal is inputted to the microcomputer 6 (step 201). Upon receiving this abnormality detection signal, the microcomputer 6 first outputs a first retract signal 26 in order to return the magnetic head to the landing zone to ensure safety of the data. In response to this signal 26, the analog switch 28 is operated. As a result, a predetermined current corresponding to a value determined by the resistor 20 and the voltage V flows in the signal line 22, so that the carriage moves in the inner peripheral direction.

Whether the magnetic head is positioned within the landing zone or not is detected by a position detection circuit 31. The detection signal thus obtained is inputted to the microcomputer 6. By writing servo data into a zone corresponding to the data recording zone which is on a predetermined disk surface for servo data and inhibiting writing the servo data into a zone corresponding to the landing zone, the position detection circuit is caused to detect this servo data, thereby making it possible to judge whether a portion where the magnetic head is located is the data recording zone or the landing zone on the magnetic disk (step 203). In order to judge whether a portion where the magnetic head is located is the data recording zone or the landing zone, a micro switch actuated by the carriage may be provided so that the micro switch is ON when the magnetic head is located on the landing zone.

When the magnetic, head enters into the landing zone, the abnormality processing is directly initiated based on the abnormality processing (step 204).

In contrast, in the case where the magnetic head does not enter into the landing zone, since the retract current based on the first retract signal 26 is weak, it is necessary to further increase the retract current. In such a case, the microcomputer delivers the second retract signal 27. When the second retract signal 27 is delivered, the analog switch 29 is closed. As a result, a current corresponding to a value determined by the resistor 21 and the voltage V is further delivered to the signal line 22 (step 205). This is repeatedly carried out until the magnetic head is completely positioned within the landing zone. Thus, when it is confirmed that the magnetic head has entered into the landing zone, the next abnormality processing (step 204) is carried out.

Without limiting to the above-mentioned embodiment, the present invention can be modified in various manners. For instance, third analog switch and resistor may be further provided to deliver a current by the third resistor when the current based on the second resistor is insufficient.

As stated above, according to the present invention, two kinds of retract signals are prepared. Accordingly, even when the magnetic head is located at any position, e.g., the innermost or outermost periphery in the data recording zone, or even when the magnetic disk drive is installed in any direction, the optimum retractive operation is possible. In addition, such an implementation of the invention also makes it possible to prevent damage of the mechanism or occurrence of broken data based on the collision of the carriage which is the bad effect due to the fact that retraction of the magnetic head is carried out by a strong force from the beginning.

What is claimed is:

1. A magnetic disk drive in which a magnetic head contacts a landing zone on a magnetic disk when the rotation of the magnetic disk is stopped, comprising:
   (a) abnormality detection means for detecting that said drive is in abnormal condition;
   (b) position detection means for detecting whether or not said head is located within said landing zone;
   (c) control means for outputting a first instruction signal when an abnormality is detected by said abnormality detection means and for outputting a second instruction signal when the first instruction signal has been output and said position detection means detects that said magnetic head is not positioned within said landing zone; and
   (d) drive means for driving said magnetic head by a first drive force when said first instruction signal is inputted and for driving said magnetic head by a second drive force when said second instruction signal is inputted, whereby said magnetic head is moved to said landing zone.

2. A magnetic disk drive according to claim 1, wherein said second drive force is greater than said first drive force.

3. A disk drive including a recording head for recording data on a recording disk, said disk drive comprising:
   (a) a control unit that receives an abnormality signal from an abnormality detection circuit and a recording head position signal from a recording head position detection circuit, said control unit generating a first retract signal on receipt of said disk abnormality signal, and generating a second retract signal, after the generation of said first retract signal, when said position signal indicates said recording head is not positioned within a predetermined landing zone on a said recording disk; and
   (b) a motor control and drive circuit coupled to said control unit, that receives said first and second retract signals generated by said control unit and drives said recording head toward said landing zone with a first force on receipt of said first retract signal, and a second driving force on receipt of said second retract driving signal.

4. A disk drive as claimed in claim 3, wherein said second drive force is greater than said first drive force.

5. A disk drive as claimed in claim 3, wherein said position detection circuit checks the position of said recording head after said motor control and drive circuit has driven said recording head with said first force.

6. A disk drive as claimed in claim 3, wherein said position detection circuit checks the position of said recording head while said motor control and drive circuit is driving said recording head with said first force.

* * * * *